United States Patent

[11] 3,607,076

| [72] | Inventors | T. O. Paine<br>Acting Administrator of the National Aeronautics and Space Administration with respect to an invention of;<br>Raffaele F. Muraca, Los Altos Hill, Calif. |
|---|---|---|
| [21] | Appl. No. | 800,204 |
| [22] | Filed | Feb. 18, 1969 |
| [45] | Patented | Sept. 21, 1971 |

[54] PROCEDURE AND APPARATUS FOR DETERMINATION OF WATER IN NITROGEN TETROXIDE
7 Claims, 3 Drawing Figs.
[52] U.S. Cl..................................................... 23/230 R,
23/232 C, 23/253 PC, 73/23.1
[51] Int. Cl........................................................G01n 31/08,
G01n 31/12
[50] Field of Search........................................... 23/230, 232
C, 253 PC; 73/23.1

[56] References Cited
UNITED STATES PATENTS

| 3,224,499 | 12/1965 | Reinecke...................... | 73/23.1 X |
| 3,356,458 | 12/1967 | Steinle et al. ................. | 23/230 |
| 3,428,432 | 2/1969 | Staunton et al............... | 23/253 PC X |

Primary Examiner—Morris O. Wolk
Assistant Examiner—R. M. Reese
Attorneys—J. H. Warden, Monte F. Mott and G. T. McCoy ABSTRACT: Nitrogen tetroxide is analyzed for water content by passing it through hot copper contained in a column wherein all nitrogen and hydrogen containing compounds are converted quantitatively to nitrogen and water. The resultant material from the column is then passed into a gas chromatograph whereupon the amount of water initially contained in the nitrogen tetroxide can be determined.

INVENTOR.
RAFFAELE F. MURACA

PROCEDURE AND APPARATUS FOR DETERMINATION OF WATER IN NITROGEN TETROXIDE

ORIGIN OF THE INVENTION

The invention described herein was made in the performance of work under a NASA contract and is subject to the provisions of section 305 of the National Aeronautics and Space Act of 1958, Public Law 83-568 (73 Stat. 435; 42 USC 2457).

BACKGROUND OF THE INVENTION

1. Field of the Invention

This invention is in the field of gas detection and more particularly is related to the detection of water in nitrogen tetroxide.

2. Description of the Prior Art

Nitrogen tetroxide, $N_2O_4$, is an important rocket propellant. Small amounts of water may remain dissolved in nitrogen tetroxide for some time at 0° C. However, it is generally recognized that within a short period of time, essentially all water is converted to a mixture of nitric acid, nitrous acid and dinitrogen trioxide in accord with the following reactions:

1. $H_2O + N_2O_4 \rightleftharpoons H^+ + NO_3^- + HNO_2$
2. $2HNO_2 \rightleftharpoons H_2O + NO + NO_2$
3. $2NO + N_2O_4 \rightleftharpoons 2N_2O_3$ The foregoing reaction products when formed by contact with even a few tenths of 1 percent of water in the nitrogen tetroxide will seriously impair its usefulness because the products greatly increase the rate of the $N_2O_4$'s attack on metals. As a result, procurement specifications place stringent limitations on the amount of water which has come in contact with nitrogen tetroxide propellant. Usually it is required that the amount of water be limited to 0.1 percent.

One method currently utilized to determine the water content of nitrogen tetroxide is based on the removal of readily volatile nitrogen tetroxide by a stream of dry nitrogen and retention of the liquid residue which is assumed to consist of the entire water, nitrous acid and nitric acid content. This procedure, however, is time consuming, highly empirical, lacks sensitivity and often yields results that are questionable. The aforegoing method has been improved by a procedure of vaporizing a sample of nitrogen tetroxide and allowing its nitric and nitrous acid content to react with sodium carbonate at 280° C. and metallic copper at 600° C. Free water, if present, and water released by neutralization of nitric acid is absorbed by anhydrous calcium sulfate and weighed. Even this improvement, however, is not suitable because it is a time consuming gravimetric procedure.

Others have more recently developed an NMR method for determining the proton equivalent in nitrogen tetroxide. Though this method is straightforward and precise, it is not attractive as a quality control procedure because of the high cost of instrumentation and the intricacy of sample preparation required.

Additionally there has previously been described gas chromatographic methods for the determination of a variety of impurities in nitrogen tetroxide and other corrosive gases. However, a method for the direct determination of water has not been reported.

OBJECTS AND SUMMARY OF THE INVENTION

Thus it is an object of this invention to provide a simple technique for the rapid determination of water in nitrogen tetroxide.

Another object of this invention is to provide a method for the utilization of gas chromatographic methods for the determination of water in nitrogen tetroxide.

The above and other objects of this invention are accomplished by a procedure wherein a heated tube containing copper wire is disposed adjacent a gas chromatographic column. Helium which is used as a carrier gas is continuously passed through the packed tube and into the gas chromatographic column. A valve which is controllably cooled admits a desired size of nitrogen tetroxide sample into the helium gas stream prior to its entering the packed tube. The high temperatures in the presence of copper in the tube serve to decompose the nitrogen tetroxide, nitric acid, nitrous acid, and other components to nitrogen, water and copper oxide. As a result, the nitric and nitrous acids are reduced to a water component which then can be detached in the gas chromatograph. It is believed that the invention will be better understood from the following detailed description and drawings.

DESCRIPTION OF THE PREFERRED EMBODIMENT

Figure 1:
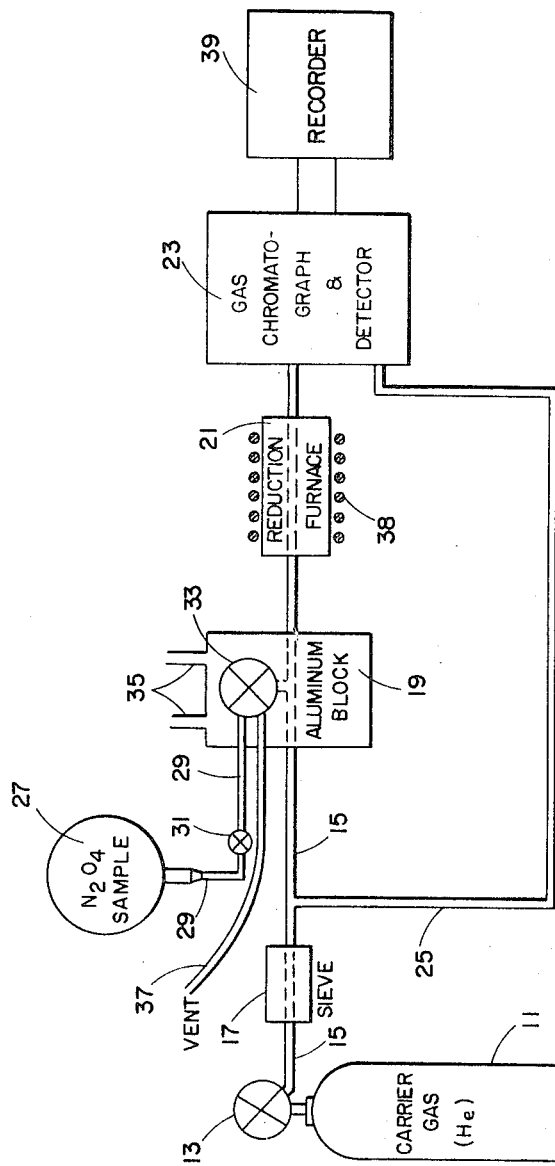
FIG. 1 is a schematic representation of the apparatus utilized to perform the procedure of the invention for the determination of water in nitrogen tetroxide.

As indicated, hereinbefore when water is mixed with $N_2O_4$ it disappears and forms $HNO_3$, and $HNO_2$, and other products which contain no hydrogen. Thus, it is not the $H_2O$ content of $N_2O_4$ which is of concern herein, since it doesn't exist as $H_2O$, but rather the hydrogen containing compounds, $HNO_3$ and $HNO_2$ resulting from the contact with water. Further, as indicated, the $HNO_3$ and $HNO_2$ components actually invalidate the practical utilization of $N_2O_4$ as a propellant, since they induce corrosion of metals by $N_2O_4$. As a result of the aforegoing, the only concern is the fact that $N_2O_4$ was exposed to water and one must then determine how much of the hydrogen-containing products are present as a result of that exposure. Thus, if it were possible to run the contaminated $N_2O_4$ sample into a gas chromatograph and obtain values for the $HNO_3$ and $HNO_2$, the problem would be readily resolved. However, the foregoing two substances are not separated reproducibly in a gas chromatograph and thus to date one has been unable to make a determination of water content utilizing the chromatograph. Specifically, nitrogen tetroxide and nitric acid tend to attack the column packings providing a succession of ill-defined peaks which cannot be readily correlated to the water content of the nitrogen tetroxide. Even columns prepared from entirely inert materials, such as perfluorinated polymers and oils, have failed to provide clean separation or yield reproducible and interpretable and chromatograms with $N_2O_4$, $HNO_3$ or red-fuming nitric acid.

The direct determination of water in nitrogen tetroxide is of little practical value because only a very small amount of water is in equilibrium with the ionic and molecular species in the $N_2O_4$ propellant, and the relationship of molecular specie $H_2O$ to the rates of corrosion of materials used in construction of rockets has not been established. Additionally, and even of greater importance is the fact that the ambient equilibrium in the sample would be shifted by removal of water in a chromatographic procedure. Thus, the separated water would be a function of the sample composition as well as a function of chromatographic variables such as sample size, temperature, column length and carrier gas flow. An extensive series of studies would be required to establish the relationship of such empirical results to the value of the propellant for rocket propulsion.

It has been discovered that the aforegoing problems relating to the determination of water in nitrogen tetroxide by gas chromatography can be averted by passing a sample of $N_2O_4$ through hot copper contained in a column situated before the inlet of the gas chromatograph. In the copper-packed column all nitrogen and hydrogen-containing compounds are converted quantitatively to nitrogen and water, and if free water is present it passes through unaltered in accord with the following equation:

4. $N_2O_4 + 2HNO_3 + 12Cu \rightarrow 2N_2 + 2H_2O + 12CuO$

Since the resulting gases are inert, selection of the chromatographic substrate is simplified since it need only provide adequate separation of water from nitrogen and other gases such as carbon dioxide.

Since water added to $N_2O_4$ generates $HNO_3$ and $HNO_2$ as indicated above in equation 1, it then follows that by establishing conditions so that the $HNO_3$ and $HNO_2$ content of $N_2O_4$ can be converted to $H_2O$, then this water must be exactly equal in weight to the water which initially caused the formation of $HNO_3$ and $HNO_2$.

As indicated, the reducing column is initially packed with copper. However, after the first sample of $N_2O_4$ has been passed through, the packing consists of a mixture of copper and copper oxide, as can be seen from the above equation 4. As a result, when organic compounds are present in the nitrogen tetroxide sample, they will be converted to water and carbon dioxide by the copper oxide. Organic compounds may also be directly oxidized by nitrogen dioxide at the elevated temperatures in the column. For example, greases contain carbon and hydrogen. Small amounts of grease dissolve in $N_2O_4$. The hydrogen content of the grease will thus be converted to water in accord with the described process. Thus, in effect, though this invention relates to the determination of water in nitrogen tetroxide, actually the method involves determining the total hydrogen content of the nitrogen tetroxide. However, from a practical standpoint, by far the major source of hydrogen compounds in the nitrogen tetroxide is water, and thus it is said that the invention is determining the water content in nitrogen tetroxide.

One of the most advantageous aspects of the particular method involved is that it also yields a quantitative value for the carbon dioxide formed from the oxidation of grease and the like. Thus, if one notes an unduly high amount of carbon dioxide, he would be led to believe that the presence of grease or other carbon-hydrogen compounds were present and thus challenge the validity of the analytical values, or run a separate determination for the grease content and make corrections as required.

It is believed that the invention will be further understood with reference to the schematic block diagram of FIG. 1. Helium carrier gas is stored in a pressure vessel 11, which is connected to a valve 13. The helium gas carrier line 15 leading from the valve to the remaining apparatus first passes through a molecular sieve 17 which serves to remove traces of water from the helium. This main carrier line 15 passes through a cooled aluminum block 19, whose function will be later described, through a reduction furnace 21 and into a standard gas chromatograph 23. A branch 25 of the gas carrier line 15 circumvents the cooling block 19 and 21 and passes directly into the chromatograph 23. This line 25 directly to the detector serves as a reference for thermal conductivity detectors employed.

The nitrogen tetroxide sample is contained in a vessel 27 which can be constructed of, for example, thick-walled glass. A short stainless steel line 29 connects the sample vessel 27 through a small intermediate valve 31 to a main sampling valve 33. The small valve 31 is optional and is used to close the sample vessel off from the system when there is no testing. The liquid sampling valve 33 is maintained at 0° to 2° C. by circulating ice water through lines 35 entering a block 19 fabricated from aluminum to fit around the valve. Control of the temperature thus insures reproducibility of the samples of $N_2O_4$. A vent line 37 is additionally connected to the sampling valve 33 and serves, as will be explained, to vent a small portion of the $N_2O_4$ sample.

The reduction furnace 21 is a quartz tube column initially packed with copper wire. In the specific device utilized, the copper wire had a diameter of 0.016 inch, and ranged from 0.03 to 0.06 inch in length. It should be apparent that various sizes of copper wire can be utilized provided that the residency in the column is sufficient for the reduction of the components passing therethrough.

Additionally, the amount of packing can vary widely with the residency time in the column governing. The quartz column is heated by an electrically heated furnace 38 to a temperature up to 900° C. Temperature as low as 300° C. should be sufficient to transform $HNO_3$ and $HNO_2$ if sufficient residence time can be established in the quartz column. The temperature of 800° is the preferred operating temperature, since it has been demonstrated that carbon dioxide will not form carbon monoxide and there is no possibility of cracking $H_2O$ into hydrogen and copper oxide. Above 800° C. it is possible that these reactions can possibly occur.

The gas chromatograph is a conventional commercial item. The chromatograph used herein is a dual column F & M Model 810 made by F & M Scientific, a Division of Hewlett-Packard, with a thermal conductivity detector operating at a filament current of 155 ma. A recorder 39 connected to the chromatograph is once again a conventional commercial item such as a single-pen recorder with a response time of 0.50 to 1.0 second.

DESCRIPTION OF PROCEDURE

In order to calibrate the system and determine its effectiveness as well, calibration vessels of 75 mm. capacity, approximately spherical in shape, were constructed from thick-walled Pyrex glass. The tubulatures were connected to stopcocks fitted with Teflon plugs and terminated with glass-to-metal Kovar seals to which were affixed stainless steel fittings. Each vessel was cleaned, dried, and evacuated and then weighed. The vacuum was released and a measured volume of water at a known temperature was introduced through the stopcock bore with the aid of a hypodermic needle. The water was frozen by immersing the vessel in liquid nitrogen. The vessel was then attached to a vacuum manifold made of ¼-inch stainless steel tubing and fittings to which was connected a cylinder of nitrogen tetroxide. The manifold and the vessel were evacuated and about 50 ml. of nitrogen tetroxide was allowed to enter the vessel. The vessel stopcock was then closed. The contents were allowed to come to room temperature and then thoroughly mixed. The vessel was reweighed at room temperature and the percentage of water added to the nitrogen tetroxide was computed. The contents were frozen again and the vessel vented to dry air. The stopcock was closed and the contents allowed to come to room temperature.

In performing the herein method, a sample vessel is attached to the system with stainless steel fittings. When thermal equilibrium is established in the chromatograph and the valve-cooling block, a small amount of nitrogen tetroxide from the sample vessel at room temperature is vented through sampling valve 33 into vent line 37 to force air out of the line 29 between it and the sampling vessel. The valve 33 is then rapidly turned to introduce the sample into line 15 leading to the analyzing system as a single slug so that the helium carrier gas will sweep it through the reduction furnace and then into the gas chromatographic column 23 where the products are separated. The flow of the helium carrier gas is at a constant rate of 75 ml. per minute. In the method, the helium flow is never stopped and, as indicated, the sample is injected directly into the flow.

The sample valve is maintained at 0° to 2° C. because nitrogen tetroxide is liquid at that temperature, has no tendency to boil and thereby create bubbles which would thereby invalidate the liquid sample volumes. Additionally, this temperature is easy to obtain by merely circulating ice water around the valve body 19. Control of the valve temperature must be maintained since the weight of liquid in a given volume is a function of the temperature. From a practical standpoint, it is difficult to obtain a lower temperature than 0° C. with ice water. However, in circulating the water through the valve there is a possibility that the water may be brought to a higher temperature. Because of this, water flow rates are adjusted so that the temperature in the valve body 19 fluctuates between 0° and 2° C. This fluctuation is in the accuracy limits of the entire analysis and the volumetric accuracy of the valve itself.

The particular sample valve 33 utilized a sample of two microliters. Due to this small amount of sample, it can be readily seen that the nitrogen tetroxide is rapidly brought to the equilibrium temperature of 0°–2° C. Thus there is no need for controlling the temperature of the sample vessel 27.

The limits of detection can be improved by taking larger samples than 2 microliters. In the gas chromatographic method, one measures the peak on a curve attributed to $H_2O$. The larger the sample, the more water present, and the peak would be larger or better defined. Thus, as long as the equipment is not overloaded one can use progressively larger samples to increase the size of the $H_2O$ peak. It has been found, however, that in the described procedure the use of a 2-microliter sample gives easily measured peaks for the water content of interest in the specifications set forth for $N_2O_4$. Since the valve plug controls the sample size, by using a valve plug with a different bore in it a larger sample can obviously be taken, if desired.

The quartz tube column utilized was 4 mm. ID by 300 mm. long. As indicated, the diameter and length of the tube must be sufficient so that the helium flow rate of 75 ml. per minute provides sufficient residency for the decomposition of the 2-microliter sample of $N_2O_4$ when the tube is tightly packed with the copper wire.

Figure 2:
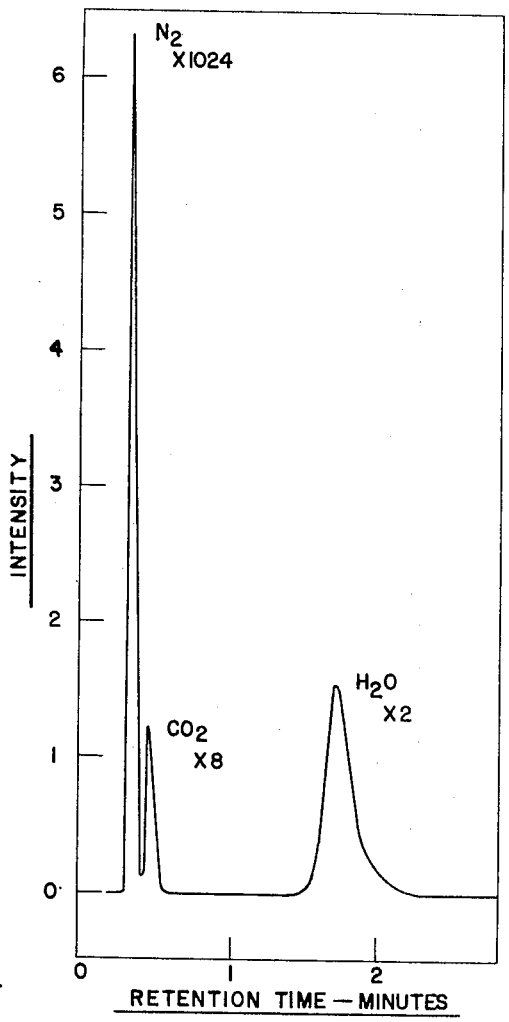
FIG. 2 is a typical gas chromatograph resulting from the method of this invention.

The chromatographic column was made from 6 feet of ¼-inch stainless steel tubing and was packed with Porapak Q made by Waters Associates. As indicated, the column was operated at 100° C. isothermal. The injection port and detection temperatures were held at 230° C. A chromatogram showing the retention times of the nitrogen, carbon dioxide, and water peaks is seen in FIG. 2.

The day to day variation of analytical results obtained with two samples indicated that results were readily obtainable with 2 percent accuracy of delivery from the sampling valve. The height of the nitrogen peak is a sensitive indicator of the amount of sample delivered by the valve and was also well within ±2 percent.

The shape of the nitrogen peak is symmetrical as long as there is sufficient copper in the column packing to reduce nitrogen tetroxide. When the copper is spent, nitric oxide will be formed and the nitrogen peak in the chromatogram appears unsymmetrical because nitric oxide has a longer retention time than nitrogen and is not cleanly resolved. The column packing can be regenerated by repeated injections of small portions of methanol while the column furnace is maintained at 400°–500° C. During regeneration, the water peak is monitored. When it reaches a low constant value, regeneration is complete. Of course, as an alternative, the combustion tube can be repacked with fresh copper.

Figure 3:
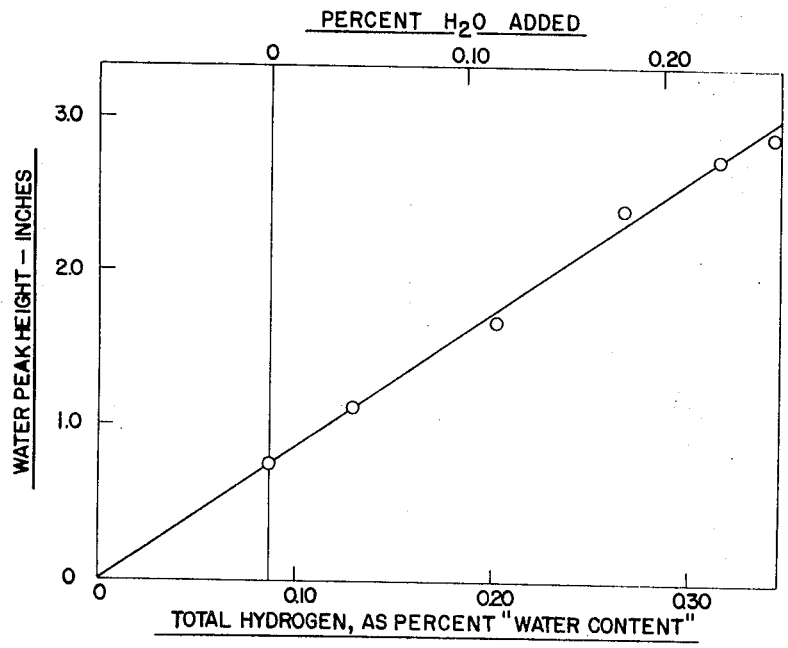
FIG. 3 is a typical calibration graph for the determination of water in $N_2O_4$.

Typical data obtained from standard samples prepared with pure $N_2O_4$ as described above, showed a coefficient variation of 1 percent. This was demonstrated by utilizing eight replicates of the sample of nitrogen tetroxide containing 0.13 percent water. When plotted as peak height vs. percent added water, data points are linear and permit determination of the initial water content of the nitrogen tetroxide used to prepare the standards, as shown in FIG. 3, which serves as a calibration graph.

What is claimed is:

1. A method for determining the amount of water present in nitrogen tetroxide comprising:
   providing a sample of the nitrogen tetroxide to be analyzed,
   passing said sample over heated copper,
   then directing said sample to a gas chromatograph and recording the output from said chromatograph whereby the amount of water present is indicatable.

2. The method of claim 1 additionally comprising:
   directing a stream of inert gas carrier over said copper and into said chromatograph,
   and depositing said sample in said gas prior to said gas contacting copper whereby said gas can carry said sample over said copper and into said chromatograph.

3. The method of claim 1 comprising:
   controlling the amount of said sample passed over said copper and directed to said chromatograph.

4. The method of claim 3 wherein said amount of sample is controlled by:
   directing the nitrogen tetroxide to be analyzed to a valve for regulating the amount to pass to said copper,
   and maintaining said valve at a temperature between 0° and 2° C.

5. The method of claim 4 comprising:
   disposing said copper in a column whereby said sample can pass through said valve,
   and heating said column to a temperature between 300° and 900° C.

6. The method of claim 5 comprising:
   heating said column to about 800° C.

7. The method of claim 5 additionally comprising:
   maintaining the residency of said sample in said column for a time period sufficient to achieve a complete reduction of the sample. 0° and 2° C. This fluctuation is in the accuracy limits of the entire analysis and the volumetric accuracy of the valve itself.

The particular sample valve 33 utilized a sample of two microliters. Due to this small amount of sample, it can be readily seen that the nitrogen tetroxide is rapidly brought to the equilibrium temperature of 0°–2° C. Thus there is no need for controlling the temperature of the sample vessel 27.